Figure 1:
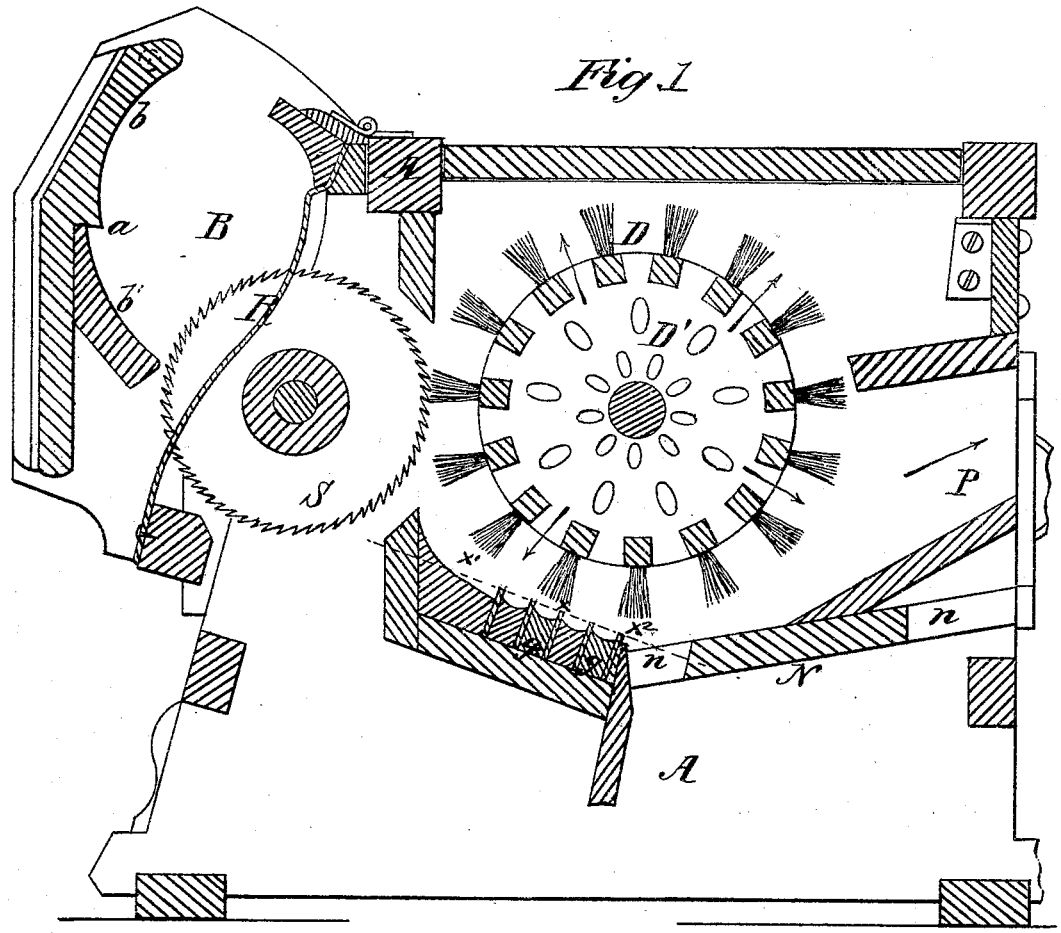

B. D. GULLETT.
Cotton-Gins.

No. 140,365.

2 Sheets--Sheet 1.

Patented July 1, 1873.

Witnesses.
J. N. Campbell
R. V. Campbell

Inventor:
Benjamin D. Gullett
by
Mason Fenwick & Lawrence

B. D. GULLETT.
Cotton-Gins.
No. 140,365.
2 Sheets--Sheet 2.
Patented July 1, 1873.
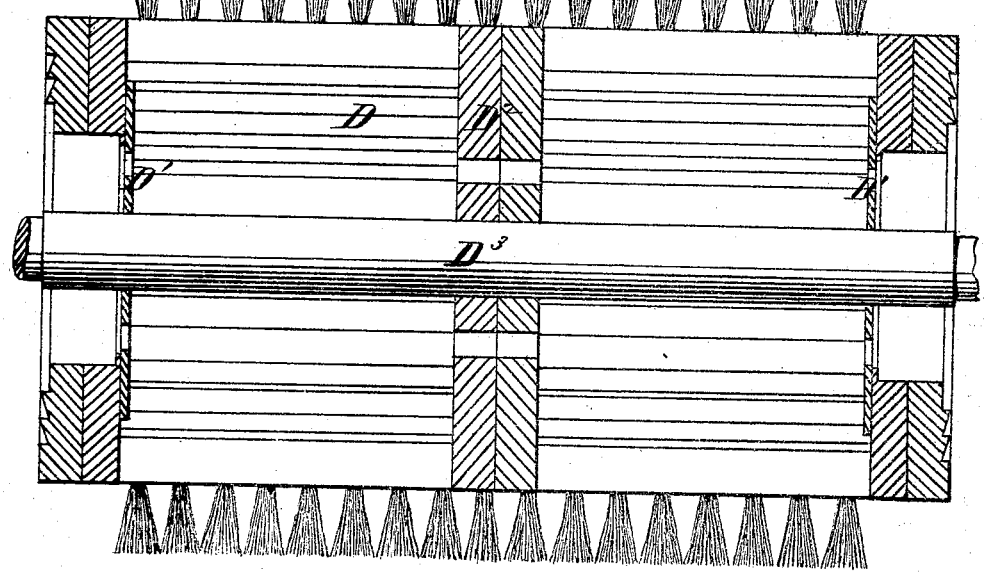
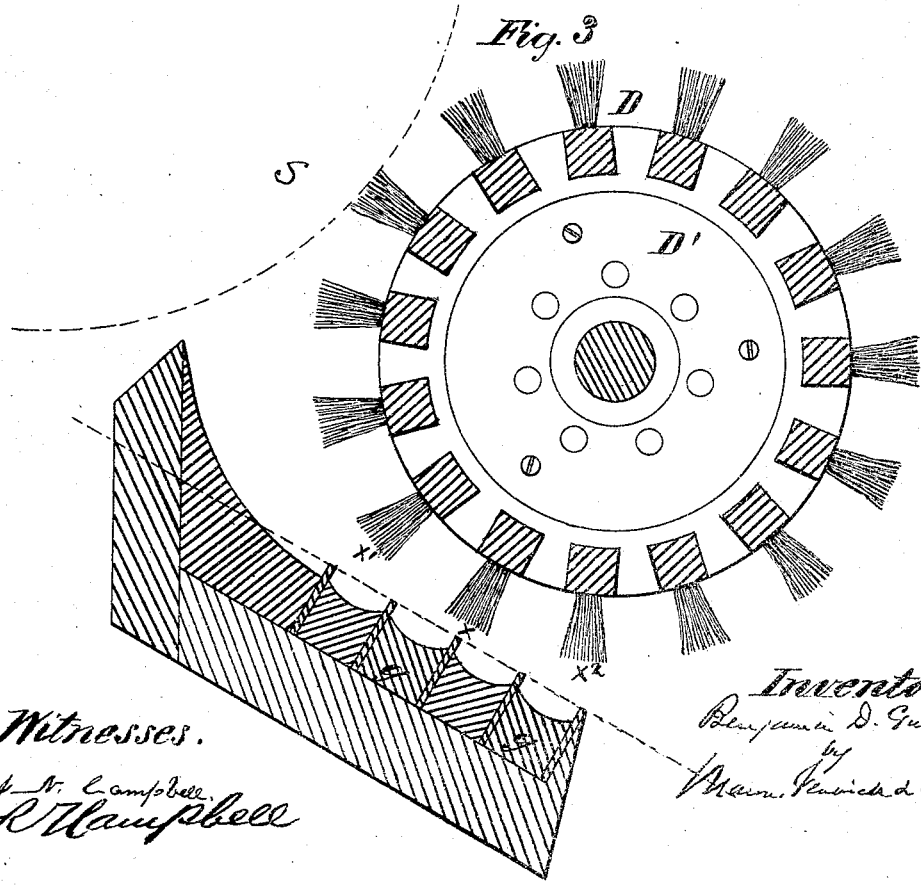
Witnesses.
Inventor:
Benjamin D. Gullett
by
Mann, Fenwick & Lawrence

UNITED STATES PATENT OFFICE.

BENJAMIN D. GULLETT, OF AMITE CITY, LOUISIANA.

IMPROVEMENT IN COTTON-GINS.

Specification formig part of Letters Patent No. 140,365, dated July 1, 1873; application filed April 14, 1873.

*To all whom it may concern:*

Be it known that I, BENJAMIN D. GULLETT, of Amite City, in the parish of Tangipahoa and State of Louisiana, have invented certain Improvements in Ginning Cotton; and I do hereby declare that the following is a full, clear, and exact description thereof, reference being had to the accompanying drawings making part of this specification, in which—

Figure 1, Plate 1, is a section taken vertically and longitudinally through the machine in a plane on one side of its center. Fig. 2, Plate 2, is a diametrical section through the stripping-brush drum. Fig. 3, Plate 2, is a cross-section through the stripping-brush drum and beaters, showing more clearly the peculiar arrangement of the same.

Similar letters of reference indicate corresponding parts in the several figures.

The nature of my invention consists in arranging beneath the stripping-brush drum a series of stationary beater-blades whose acting edges are in, or nearly in, a plane at right angles to a radius of this brush-drum for the purpose of allowing the cotton, as it leaves the gin-saws, free access between the brushes and beater-blades, and also free exit therefrom, at the same time bringing the cotton in such close relation to the brush-drum that it will be thoroughly whipped and deprived of all impurities, as will be hereinafter explained.

The following description of my invention will enable others skilled in the art to understand it.

In the accompanying drawings, A represents the frame of the machine, which is properly housed in. B is the feed box or hopper; S, the well-known ginning-saws; R, the ribbed breast, through which the saws work; and D is the stripping-brush drum, which may be constructed in the usual well-known way; but which I prefer to construct hollow, and leave spaces between the brushes for the outward escape of currents of air that will prevent the brushes from clogging. The hopper B is hinged at its upper end, so that it can be turned up when it is desired to obtain access to the gin-saws S; and the inner surfaces $b$ $b'$ of this hopper are concave, as shown in Fig. 1, and terminate in a shoulder at $a$, which is about midway between the upper and lower edges of the hopper-chamber in front. The upper concave surface $b$ is slightly in advance of the corresponding lower surface at the junction of the two surfaces; and, while the lower surface $b'$ recedes from the gin-saws S, the upper surface $b$ curves forward, so as to contract the mouth of the hopper. The concave surface, just above the saw-breast R, terminates, at its lower end, at the upper end of this breast, in a shoulder, corresponding to the shoulder $a$, shown in Fig. 1.

This arrangement reduces friction on the rolls of cotton while they are being acted on by the saws.

The stripping-brush drum D is composed of a number of separated brush-heads, which are arranged concentrically around the center of the drum, and secured to circular ends, through which large holes are made that are covered by metallic plates $D^1$, perforated as shown in in Figs. 1, 2, and 3. Between the ends of the drum, and inside thereof, is a circular perforated portion, $D^2$, which is intended for more firmly securing the brush-heads to the shaft of the drum.

When the drum D is rapidly rotated air will be drawn into it from without through both of the perforated end plates $D^1$, and forced out through the spaces between the brush-heads, and between the rows of brushes. These outward currents prevent the accumulation of lint about the brushes, and also serve, in a great measure, to open up the cotton, and thus facilitate the separation of the motes or foreign substances. This expulsion of air from the drum also prevents the loose cotton from getting inside of the drum.

Beneath the brush-drum D is an opening for the escape of foreign matters, which opening can be regulated in size; or it can be entirely closed by means of a board, N, working in grooves $n$ formed in the sides of the frame A. When the said opening is closed, and the end of the flue P, which leads into the room, is closed, rats will be prevented from getting at the stripping-drum brushes; consequently it will not be necessary to remove this drum from the machine, when not in operation, to preserve the brushes from the ravages of rats which destroy the brushes on account of the oil they gather from the cotton.

The opening above referred to beneath the brush-drum is for the purpose of allowing foreign substances whipped out of the cotton to fall into a mote-chamber below the sliding board N. In front of the said mote-opening, and below the brush-drum D, are a number of thin stationary rigid blades, $g$, the upper edges of all of which are in a plane, which is perpendicular, or nearly so, to a radius of the brush-drum D, so that the central one of the blades at the point $x$, is nearest the brushes of the drum D, while the blades at the terminuses of the series are furthest from the brushes or perimeter of the drum.

The blades $g$ are in lines parallel to the axis of the drum D, and are supported upon an inclined board located beneath the longitudinal axis of the drum D, and in such relation to the gin-saws S that the cotton is received into a gradually-converging space, $x^1$, as it is stripped from the saws, which convergence increases until the passing cotton arrives at the the point $x$, at which point it is subjected to the greatest whipping action of the brushes of the drum D. The cotton having passed the point $x$, at which it has received the severest or most thorough whipping of the brushes in order to loosen or separate the motes from the fibers of the cotton, then passes into a space, $x^2$, which gradually diverges from the point $x$, as shown in Fig. 3. In other words, after the cotton leaves the saws it is crowded into the converging space $x^1$, where it is acted on by a gradually-increasing force until it passes the point $x$, after which the beating action will gradually diminish, and the cotton will be thus opened up and deprived of foreign substances, ready for its discharge from the machine into the lint-room through the flue P.

It will thus be seen that the same brush-drum first strips the cotton from the saws, then whips it with an increasing power, and afterward with a decreasing power, during which latter act it opens up the cotton and expels the motes and impurities therefrom.

Having thus described my invention, what I claim as new, and desire to secure by Letters Patent, is—

The arrangement of blades $g$, or their equivalent, with relation to the revolving brush of a saw-gin, substantially as described, for the purpose set forth.

BENJAMIN DAVID GULLETT.

Witnesses:
    J. N. CAMPBELL,
    R. T. CAMPBELL.